US012809567B2

(12) United States Patent
Wang et al.

(10) Patent No.: US 12,809,567 B2
(45) Date of Patent: Nov. 24, 2026

(54) METHOD OF GENERATING DISPLAY BACKGROUND OF ELECTRONIC DEVICE AND ELECTRONIC DEVICE

(71) Applicant: Lenovo (Beijing) Limited, Beijing (CN)

(72) Inventors: Ke Wang, Beijing (CN); Yanan Cui, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/929,159

(22) Filed: Oct. 28, 2024

(65) Prior Publication Data

US 2025/0217093 A1 Jul. 3, 2025

(30) Foreign Application Priority Data

Dec. 28, 2023 (CN) .......................... 202311836111.1

(51) Int. Cl.
*G06F 3/14* (2006.01)
*G09G 3/20* (2006.01)

(52) U.S. Cl.
CPC .......... *G06F 3/1446* (2013.01); *G06F 3/1431* (2013.01); *G09G 3/2096* (2013.01); *G09G 2340/0407* (2013.01); *G09G 2340/0464* (2013.01); *G09G 2354/00* (2013.01); *G09G 2356/00* (2013.01); *G09G 2360/04* (2013.01); *G09G 2370/042* (2013.01)

(58) Field of Classification Search
CPC . G06T 7/11; G06T 3/4038; G06T 5/50; G06T 2207/20084; G06T 2207/10024; G06T 2207/20081; B60R 2300/303; B60R 2300/105; G06V 10/82; G06V 10/44; G06V 10/764; G16H 30/40; H04N 2013/0081; G05D 1/0088
See application file for complete search history.

(56) References Cited

U.S. PATENT DOCUMENTS

| | | | | |
|---|---|---|---|---|
| 2014/0101577 | A1* | 4/2014 | Kwak | G06F 3/1431 715/761 |
| 2017/0365037 | A1* | 12/2017 | Urban | G06T 3/403 |
| 2018/0181252 | A1* | 6/2018 | Park | G09G 3/2092 |
| 2020/0234628 | A1* | 7/2020 | Kim | G09G 3/32 |
| 2022/0122218 | A1* | 4/2022 | Yoon | G06T 3/40 |

* cited by examiner

*Primary Examiner* — Sujit Shah
(74) *Attorney, Agent, or Firm* — ANOVA LAW GROUP, PLLC

(57) ABSTRACT

A display background generation method includes, in response to a trigger operation on one display screen of an electronic device, determining a first background, generating, based on the first background, a second background that is correlated with the first background, and displaying at least one of the second background or the first background on a plurality of display screens, including: displaying the second background and the first background on the plurality of display screens, respectively, or displaying partial contents of the second background on the plurality of display screens, respectively. The partial contents corresponding to the plurality of display screens constitute the second background.

18 Claims, 10 Drawing Sheets

METHOD OF GENERATING DISPLAY BACKGROUND OF ELECTRONIC DEVICE AND ELECTRONIC DEVICE

CROSS-REFERENCE TO RELATED APPLICATION

This application claims priority to Chinese Patent Application No. 202311836111.1, filed on Dec. 28, 2023, the entire content of which is incorporated herein by reference.

TECHNICAL FIELD

The present disclosure generally relates to the field of information technologies and, more particularly, to a method for generating display background of an electronic device, and an electronic device.

BACKGROUND

With the development of electronic information technology, more and more innovative forms of smart terminals have emerged, among which electronic devices such as dual-screen laptops and dual-display mobile terminals have received widespread attention. Wallpapers are a commonly used personalized setting for users, and colorful wallpapers are crucial to embody user emotional value.

In related art, a wallpaper library of an electronic device only provides wallpapers for a single screen. When users use an electronic device with dual screens, it is very difficult to find dual-screen wallpapers that match the size of the two screens, are high-definition, and have related stories, resulting in a poor user experience. However, there is no solution to this problem.

SUMMARY

In accordance with the present disclosure, there is provided a display background generation method including, in response to a trigger operation on one display screen of an electronic device, determining a first background, generating, based on the first background, a second background that is correlated with the first background, and displaying at least one of the second background or the first background on a plurality of display screens, including: displaying the second background and the first background on the plurality of display screens, respectively, or displaying partial contents of the second background on the plurality of display screens, respectively. The partial contents corresponding to the plurality of display screens constitute the second background.

Also in accordance with the present disclosure, there is provided an electronic device including a memory and a processor. The memory stores a computer program. The processor is configured to execute the computer program to, in response to a trigger operation on one display screen of an electronic device, determine a first background, generate, based on the first background, a second background that is correlated with the first background, and display at least one of the second background or the first background on a plurality of display screens, including: displaying the second background and the first background on the plurality of display screens, respectively, or displaying partial contents of the second background on the plurality of display screens, respectively. The partial contents corresponding to the plurality of display screens constitute the second background.

DETAILED DESCRIPTION OF THE EMBODIMENTS

Figure 1:
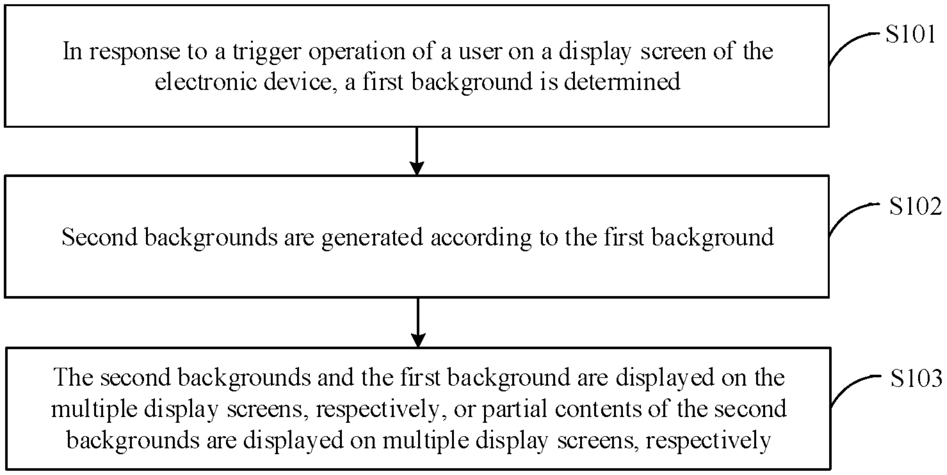
FIG. 1 is a flowchart of a method for generating display background of an electronic device consistent with the present disclosure.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure. Various modifications may be made to the embodiments of the present disclosure. Thus, the described embodiments should not be regarded as limiting, but are merely examples. Those skilled in the art will envision other modifications within the scope and spirit of the present disclosure.

The following description refers to "some embodiments," which describe a subset of all possible embodiments. It should be understood that "some embodiments" may be the same subset or different subsets of all possible embodiments, and may be combined with each other without conflict.

It should also be noted that the terms "first\second\third" involved in the embodiments of the present disclosure are only used to distinguish similar objects and do not represent a specific ordering of the objects. It is understandable that "first\second\third" may be interchanged in a specific order or sequence where permitted, so that the embodiments of the present disclosure described herein can be implemented in an order other than that illustrated or described herein.

A dual-screen display is a new type of a display device with two display screens, such as a dual-screen laptop, a mobile terminal with flexible foldable screens, etc., which further expands the display area of electronic devices, facilitates users to achieve multi-task collaborative processing more efficiently, and improves the efficiency of use in multiple scenarios such as office, creation, and entertainment. The two screens are able to display different content independently without switching windows back and forth, which improves the consistency of use.

Wallpapers are a commonly used personalized setting for users. Colorful wallpapers are crucial to embody the emotional value of users' digital products. A single-screen device has some default wallpapers built into the system, and users are able to manually upload some pictures and set them as wallpapers. However, this method can only be applied to the wallpaper of one screen.

For users of a dual-screen device, they can generally only set the wallpaper through the copy mode, that is, the wallpapers of the two screens are the same. Even when the device supports dual-screen setting of different wallpapers, it is very difficult for the users to find dual-screen wallpapers that are of high definition and have related stories that meet the size of the two screens. The user experience is poor, and there is no solution to this problem.

The present disclosure provides a method for generating display background of an electronic device and an electronic device, to at least partially alleviate the above problems. In the present disclosure, according to first background determined by a user, second background with correlation may be generated and displayed. The background of multiple screens may be set with correlation. Therefore, the operation process of searching for wallpapers by users may be simplified, the correlation between the wallpapers may be improved, and the performance of the electronic device may be improved.

One embodiment of the present disclosure provides a method for generating display background of an electronic device. As shown in FIG. 1 which is a flowchart of a method for generating display background of an electronic device, the method may be applied to an electronic device with at least one display screen.

The electronic device may include a laptop computer with at least one display screen, and on this basis, the laptop computer may also be connected to other devices with display screens for visual expansion, such as fixed display screens, mobile terminals, etc. In other words, the electronic device may be a system composed of at least one device with a screen, and multiple devices may communicate with each other through hard-wired lines or networks under the same processor.

As shown in FIG. 1, in one embodiment, the method for generating the display background of the electronic device includes S101 to S103.

At S101, in response to a trigger operation of a user on one display screen of the electronic device, first background is determined.

In one embodiment of the present disclosure, the trigger operation of the user on the display screen of the electronic device may be a trigger operation generated by the user directly touching the display screen, or may be an operation generated by the user clicking through other devices, such as a touchpad, a mouse, or the like. The content of the trigger operation may include that, for example, the user specifies a background from a background library preset by the electronic device according to actual needs; or may include, for example, specifying a background currently displayed on any display screen; or may include, for example, uploading a background to the electronic device according to preferences; or may include, for example, downloading a background from the network to the electronic device.

Further, according to the user's trigger operation, the background specified by the user through the trigger operation may be used as the first background.

At S102, second background is generated according to the first background.

There may be a correlation between the second background and the first background.

The second background may be background generated by the electronic device according to the first background through an artificial intelligence generative content (AIGC) algorithm. AIGC is a content production algorithm, and artificial intelligence (AI) may automatically generate the second background with correlation according to the first background and rules obtained by training, such as style, composition, color, technique, etc. Exemplarily, the AIGC algorithm may include a diffusion model, a semantic segmentation model, or other custom graph generation models, etc., which are not listed here.

Further, depending on the AIGC algorithm used, the second background may include at least a part of the content of the first background. In this case, the size of the second wallpaper may be the sum of the sizes of multiple display screens, and the second background may be divided and displayed on each display screen respectively. Or, the second background may not include the first background.

In one embodiment of the present disclosure, when the second background does not include the first background, the number of the second background may be specifically determined according to the number of the display screens included in the electronic device. Exemplarily, in one embodiment shown in FIG. 4, when the electronic device 20 includes a dual-screen device 201 and an external display screen 202, two different second background may be generated according to the first background, and both of the two second background may have correlation with the first background. It is understandable that, according to the size of each display screen, multiple second backgrounds each matching a display screen may be adjusted and output.

It should be noted that the first background and the second background may be static wallpapers, including hand-painted wallpapers, photographic wallpapers, screen capture wallpapers of film and television works, etc., and may also be dynamic wallpapers, which are not specifically limited here.

It should also be noted that the correlation between the first background and the second background may include that the overall picture composed of the first background and the second background forms a story, or the first background and the second background have the same theme, or the first background and the second background may interact with each other, etc., which will not be elaborated here.

At S103, the second background and the first background are displayed on the multiple display screens, respectively, or partial contents of the second background are displayed on the multiple display screens, respectively.

In one embodiment, the partial contents corresponding to the multiple display screens may together constitute the second background.

In one embodiment of the present disclosure, as mentioned above, when the second background does not include the first background, at least one second background and the first background may be displayed on the corresponding matching display screens, respectively.

In another embodiment, when the second background includes at least a part of the content of the first background, the second background may be divided according to the size of the multiple display screens and displayed on the corresponding display screens, respectively. That is, multiple second backgrounds matching the multiple display screens may be obtained according to the entire second background. In this case, the part of the content corresponding to the multiple display screens may directly constitute the second background. Or, the second background may be framed or cropped according to the size of the multiple display screens and displayed on the corresponding display screens, respectively. That is, multiple second backgrounds matching the multiple display screens may be obtained according to the part of the second background. In this case, the part of the content corresponding to the multiple display screens may constitute the part of the content of the second background. Alternatively, in another embodiment, after the second background is segmented, when part of the content of the second background determined by cropping or framing is not compatible with one corresponding display screen, the resolution of this part of the content may need to be adaptively adjusted before it is displayed on the corresponding display screen. In this case, the resolution of at least one of the partial contents corresponding to the multiple display screens may need to be adjusted before the second background is formed.

The present disclosure provides a method for generating display background of an electronic device. In the present disclosure, the second background with correlation may be generated and displayed based on the first background determined by the user. The background of multiple display screens may be set with correlation. Therefore, the operation process of searching for wallpapers by users may be simplified, the correlation between the wallpapers may be improved, and the performance of the electronic device may be improved.

In another embodiment of the present disclosure, the electronic device may include multiple display screens are parts of the electronic device, or at least one of the multiple display screens may belong to an external display screen of the electronic device.

Figure 2:
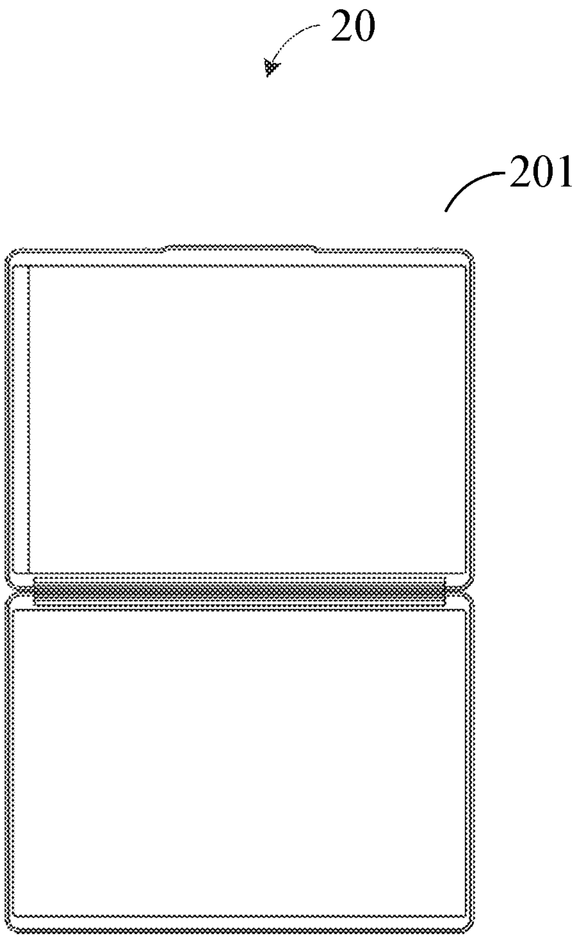
FIG. 2 is a schematic diagram showing a display mode of an electronic device consistent with the present disclosure.
Figure 3:
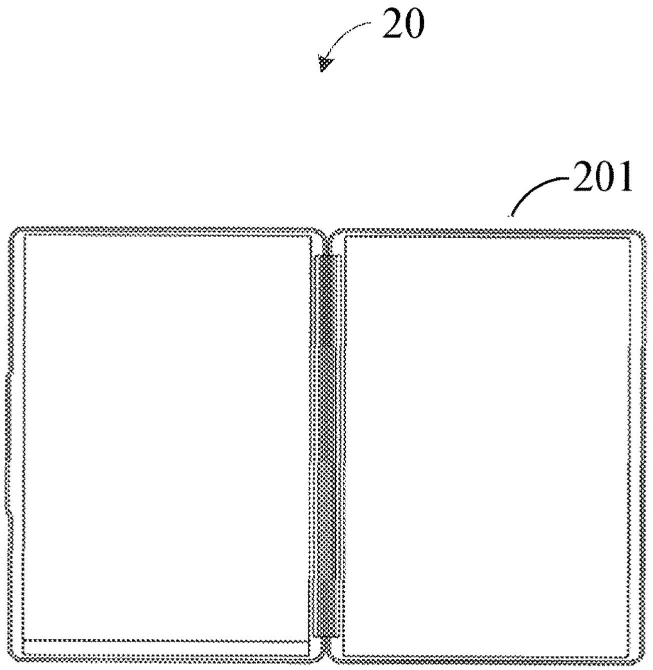
FIG. 3 is another schematic diagram showing a display mode of an electronic device consistent with the present disclosure.

In one embodiment of the present disclosure, as shown in FIG. 2 and FIG. 3, the electronic device 20 may include a dual-screen device 201 having two display screens. That is, the electronic device 20 may include two display screens. The user may change the placement direction of the dual-screen device 201 during use to form different modes. Exemplarily, as shown in FIG. 2, when the dual-screen device 201 faces the user, the two display screens may be arranged up and down, which may be called a PC mode. As shown in FIG. 3, when the dual-screen device 201 faces the user, the two display screens may be arranged left and right, which may be called a BOOK mode. It should be noted that the sizes of the two display screens in the dual-screen device 201 may not be necessarily the same. Moreover, it may be understood that when the mode changes, the size of the background displayed on the two display screens of the dual-screen device 201 may generally adapt to the change.

Figure 4:
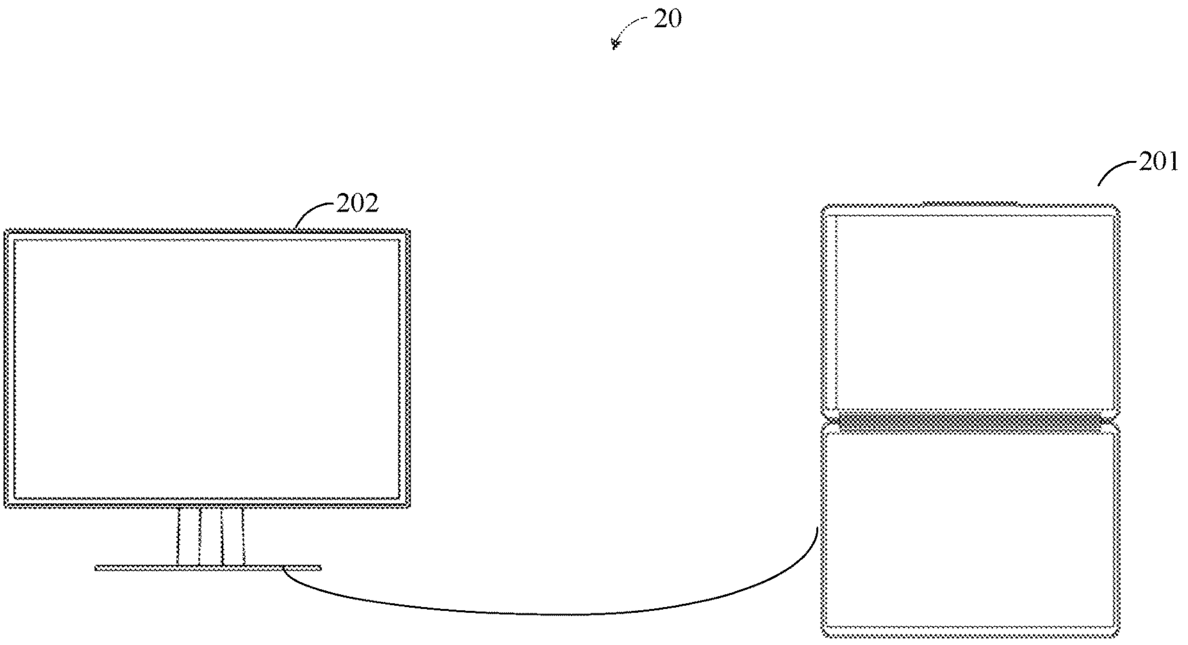
FIG. 4 is another schematic diagram showing a display mode of an electronic device consistent with the present disclosure.

In some embodiments, as shown in FIG. 4, the electronic device 20 may also include a dual-screen device 201 and an external display screen 202. That is, the electronic device 20 may include 3 display screens. The external display screen 202 may be connected to the dual-screen device 201 via a hard-wired line, and may be a device for expanding the display function of the dual-screen device 201. The size and resolution of the external display screen 202 may be different from those of the dual-screen device 201, or may be the same as those of the dual-screen device 201, depending on the user's choice. The external display screen 201 may also be a mobile terminal such as a mobile phone, a tablet computer, a smart bracelet, or a fixed terminal such as a desktop display screen. It should be understood that the dual-screen device 201 connected to the external display screen 202 may include multiple modes, such as the PC mode shown in FIG. 2, or the BOOK mode shown in FIG. 3, or other pre-set modes, which are not listed here. In some other embodiments, the electronic device 20 may include a single-screen device 201 and may be connected to an external display screen 202. Background suitable for the display screen of the electronic device itself and the external display screen may be generated according to the first background.

It should also be noted that the dual-screen device 201 in the electronic device may also be connected to multiple external display screens in other embodiments, such that the number of display screens in the electronic device may be determined adaptively.

The present disclosure provides a method for generating display background of an electronic device. In the present disclosure, multiple display screens may be distributed in different ways, increasing the application scenarios of the method and improving the flexibility of the application of the method.

Figure 5:
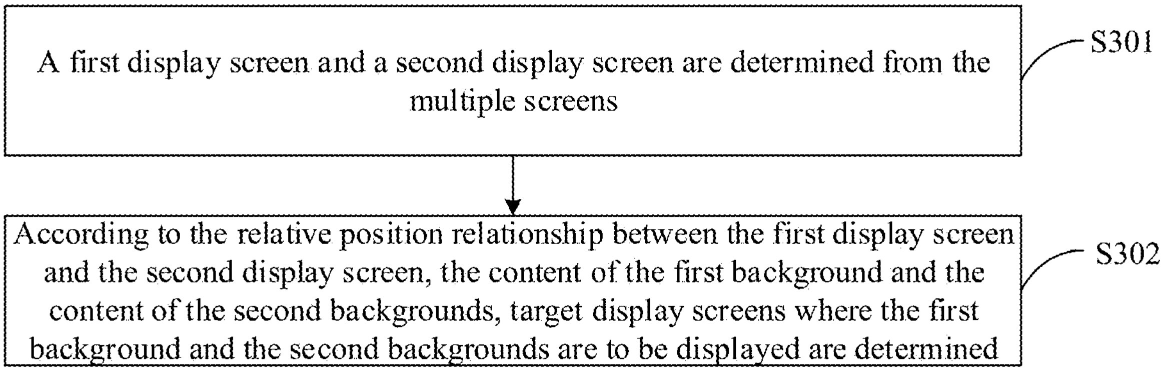
FIG. 5 is another flowchart of a method for generating display background of an electronic device consistent with the present disclosure.

In one embodiment shown in FIG. 5, displaying the second background and the first grounds on the multiple display screens, may include S301 and S302.

At S301, a first display screen and a second display screen are determined from the multiple screens.

In one embodiment of the present disclosure, the upper screen or the left screen of the dual-screen device included in the electronic device may be used as the first display screen, and the right screen or the lower screen of the dual-screen device included in the electronic device may be used as the second display screen. Alternatively, in another embodiment, when the electronic device includes an external display screen, the first display screen may be the external display screen, or the first display screen or the second display screen may include the external display screen, which is not specifically limited in the present disclosure, At S302, according to the relative position relationship between the first display screen and the second display screen, the content of the first background, and the content of the second background, target display screens where the first background and the second background are to be displayed are determined.

One target display screen may be any one of the first display screen and the second display screen.

It should be noted that the electronic device may determine the relative position relationship between the first display screen and the second display screen according to the placement direction of the dual-screen device relative to the user, that is, the mode of the electronic device. Exemplarily, when the electronic device is in the PC mode, the relative position relationship between the first display screen and the second display screen may be a top-to-bottom relationship. When the electronic device is in the BOOK mode, the relative position relationship between the first display screen and the second display screen may be a left-to-right relationship. When the electronic device also includes an external display screen, the relative position relationship between the second display screen corresponding to the external display screen and the first display screen and the second display screen corresponding to the dual-screen device may be determined according to the user's input through the interactive interface.

As mentioned above, the first background and the second background are correlated background, and they may need to be presented in a specific arrangement to trigger the viewer's association and highlight their relevance.

Figure 6:
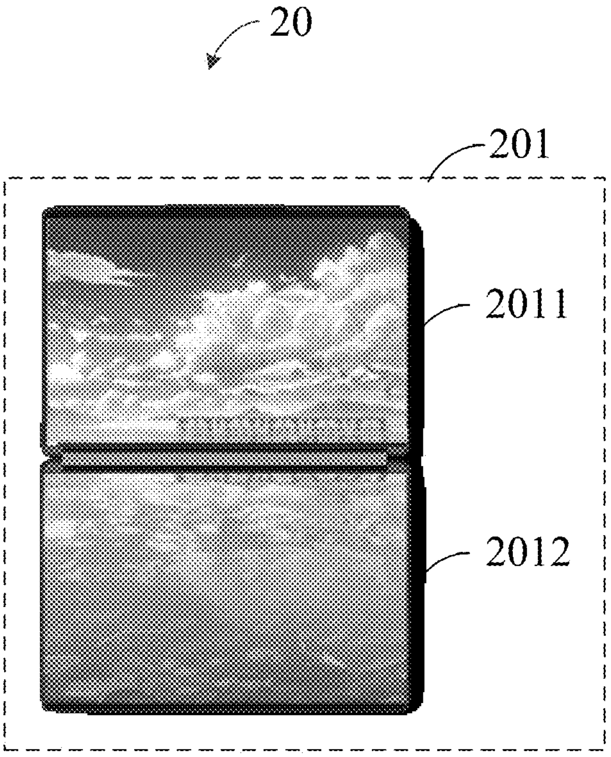
FIG. 6 is a schematic diagram showing display background of an electronic device consistent with the present disclosure.

Exemplarily, in one embodiment, when the second background does not include the first background, at least one second background may be generated based on the first background. Taking the electronic device 20 which only includes a dual-screen device 201 as an example, the dual-screen device 201 may be in the PC mode, and the second background may be a single picture. When the first display screen is the upper screen 2011 of the dual-screen device 201 and the second display screen is the lower screen 2012 of the dual-screen device 201, as shown in FIG. 6, the content of the first background may be the sky, and the second background with seawater as the content may be generated by AIGC based on the first background with the sky as the content. According to the content of the first background and the second background, and the relative position relationship between the first display screen and the second display screen, the target display screen corresponding to the first background may be the first display screen, and the target display screen corresponding to the second background may be the second display screen. The two background may be displayed on the corresponding target display screens, respectively, and the combination may present the effect of the sea and sky being one color.

In another embodiment, the user may generate one second background with the sky as the content based on the first background with seawater as the content through AIGC. Based on the contents of the first background and the second background, and the relative positional relationship between the first display screen and the second display screen, as shown in FIG. 6, the target display screen corresponding to the first background may be the second display screen, and the target display screen corresponding to the second background may be the first display screen, such that the two background are displayed on the corresponding target display screens respectively, presenting an effect of the sea and sky being one color.

Figure 7:
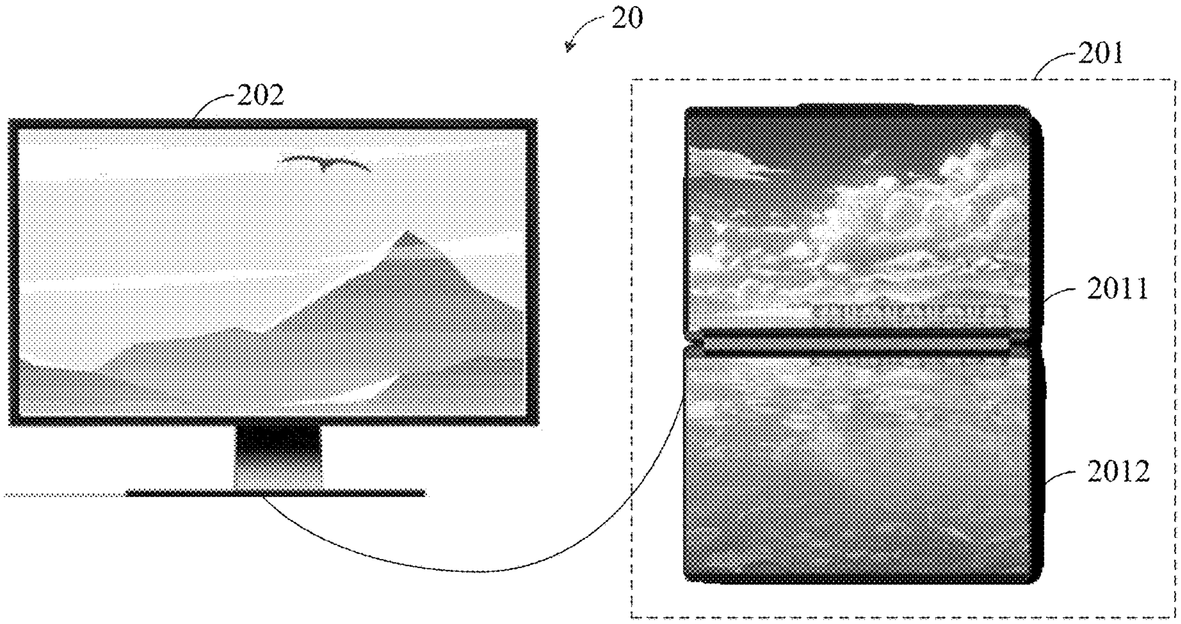
FIG. 7 is another schematic diagram showing display background of an electronic device consistent with the present disclosure.

In another embodiment, as shown in FIG. 7, when the electronic device 20 includes an external display screen 202 and a dual-screen device 201, the first background may also be the background currently displayed on either the dual-screen device 201 or the external display screen 202. For example, when the first background is the background of the mountain content displayed on the external display screen 202, two second background may be generated through AIGC, including one second background with sea water content and second background with sky content. Therefore, the arrangement method that best presents the story may be determined based on the content of the first background and the content of the two second background, and then the corresponding background may be displayed on the corresponding target display screens according to the relative position relationship between the external display screen 202 and the dual-screen device 201 and the corresponding relationship between the generated two second background and the arrangement method of the first background. For example, the external display screen 202 may be determined as the first display screen, which may be the target display screen corresponding to the first background with mountains as the content. When the dual-screen device 201 is in the PC mode at this time, the upper screen 2011 of the dual-screen device 201 may serve as one second display screen, which is the target display screen corresponding to the second background with the sky as the content. The lower screen 2012 of the dual-screen device 201 may serve as another second display screen, which is the target display screen corresponding to the second background with sea water as the content.

The electronic device 20 may include a single screen 201 and an external display screen 202, and one display screen on which one corresponding background is displayed may be determined according to the relative position relationship between the single screen 201 and the external display screen. Further, as mentioned above, the first background may have been displayed on the screen or selected by the user. In some embodiments of the present disclosure, FIG. 6 and FIG. 7 may be the display effects presented on multiple display screens after the second background is generated.

In some other embodiments, displaying the partial contents of the second background on the multiple display screens respectively such that the partial contents corresponding to the multiple display screens constitute the second background, may include:

based on the relative position relationship between the first display screen and the second display screen, determining the target partial contents corresponding to the first display screen and the second display screen respectively.

Figure 8:
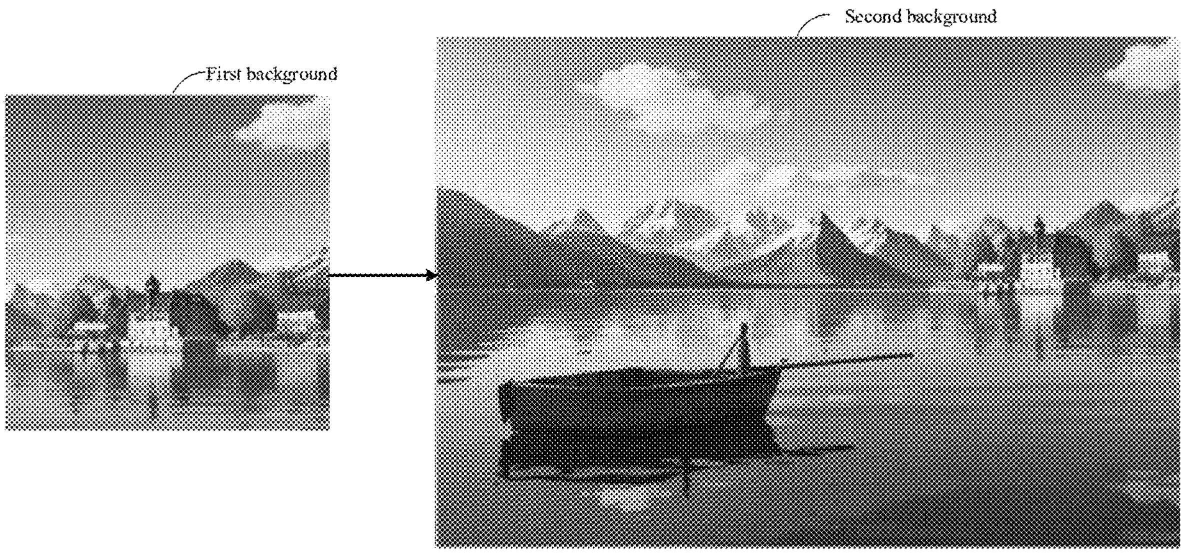
FIG. 8 is a schematic diagram showing generating second background from first background consistent with the present disclosure.

In one embodiment of the present disclosure, as shown in FIG. 8, according to the first background of the shore, the second background including at least part of the content of the first background may be generated, and the content of the second background may be water connecting the sky. Therefore, the second background may be divided, framed or cropped according to the relative position relationship and size of the first display screen and the second display screen to obtain the target partial contents displayed by the first display screen and the second display screen respectively.

Figure 9:
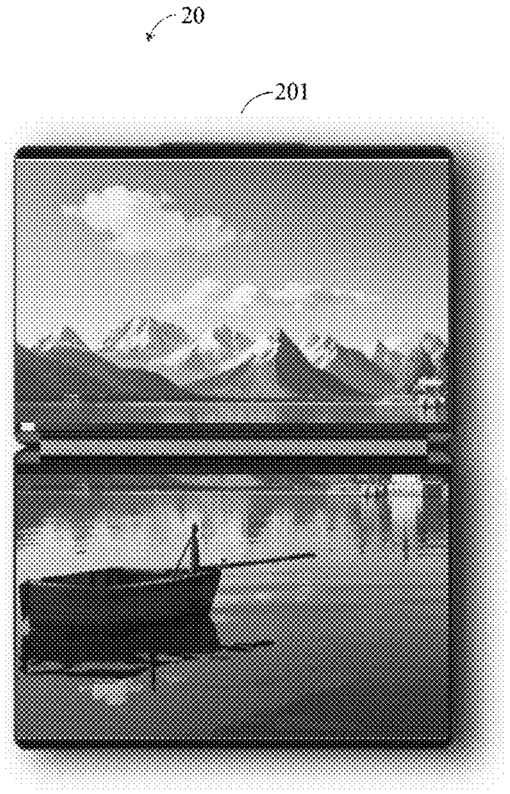
FIG. 9 is another schematic diagram showing display background of an electronic device consistent with the present disclosure.

For example, in one embodiment as shown in FIG. 9, the electronic device 20 may include a dual-screen device 201, and the dual-screen device 201 may be in the PC mode. The first display screen may be the upper screen 2011 of the dual-screen device, and the second display screen may be the lower screen 2012 of the dual-screen device. The lake shore may be used as the segmentation position. According to the arrangement of the multiple background before segmentation, the target partial content with shore may be displayed in the first display screen and the target partial content with the lake water may be displayed on the second display screen. Or, according to user needs, after being segmented or cropped in other segmentation methods, the segmented or cropped background may be displayed on multiple screens.

Figure 10:
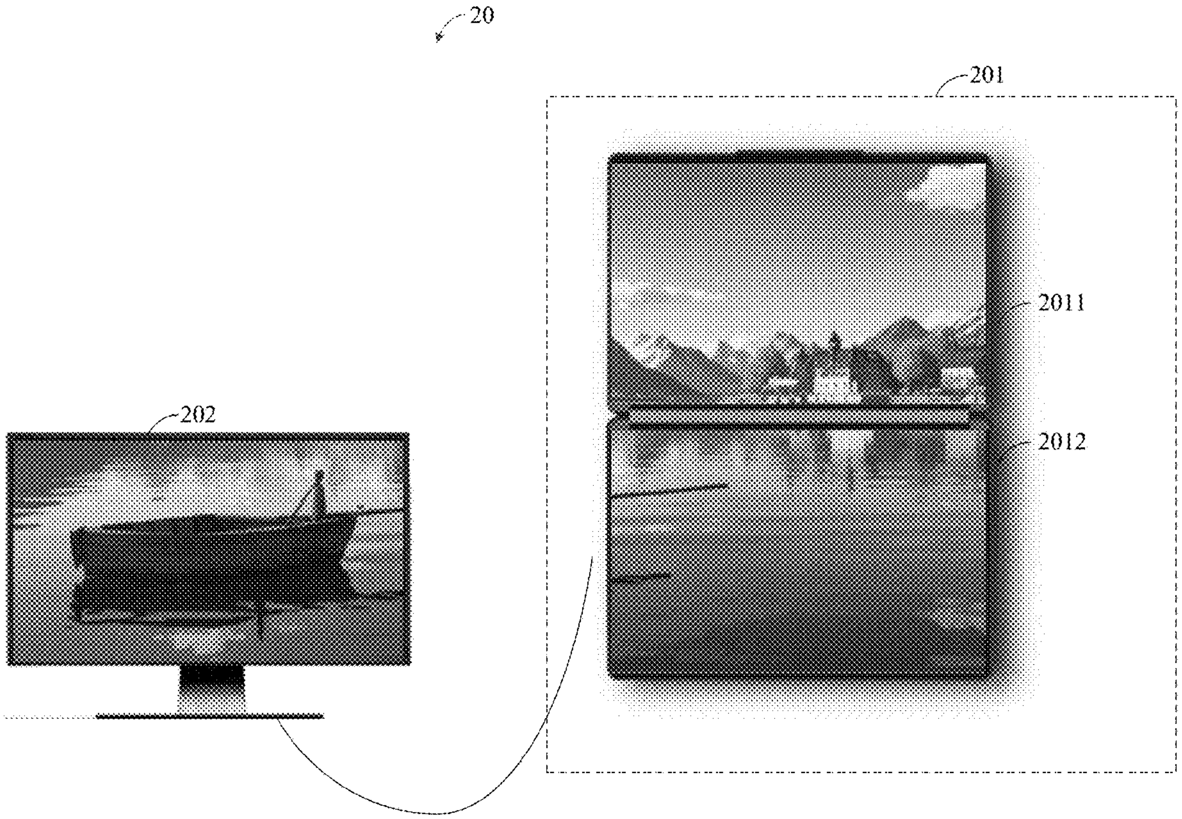
FIG. 10 is another schematic diagram showing display background of an electronic device consistent with the present disclosure.

Alternatively, in another embodiment, as shown in FIG. 10, when the electronic device 20 includes a dual-screen device 201 and an external display screen 202, and the dual-screen device 201 is in the PC mode, the first display screen may include the upper screen 2011 of the dual-screen device 201, and the second display screen may include the lower screen 2022 of the dual-screen device and the external display screen 202. After cutting out multiple parts of the content from the second background as multiple background, based on the relative position relationship of multiple display screens and the arrangement of multiple background in the second background before cutting, the boat that is cut out may be displayed as the target partial content corresponding to the second display screen (the external display screen 202), the lake water may be displayed as the target partial content corresponding to the second display screen (the lower screen of the dual-screen device), and the building on the shore may be displayed as the target partial content corresponding to the first display screen.

Optionally, the background displayed on the external display screen 202 may partially overlap with the content displayed on the dual-screen device 201. For example, the background displayed on the external display screen 202 may be a combination of the content displayed on the upper screen and the lower screen of the dual-screen device, or the same as the content displayed on one of the upper screen and the lower screen, which is determined according to the user setting.

It should be noted that the above embodiment takes the dual-screen device 201 in the PC mode as an example. When the dual-screen device is in the BOOK mode, adaptive adjustments may be made.

The present disclosure provides a method for generating display background of an electronic device. According to the content of the first background, the second background, and the relative position relationship of the multiple display screens, the corresponding relationship between the display screen and the background may be determined for display, which may maximize the correlation between the multiple background and enrich the fun of background settings.

In another embodiment of the present disclosure, generating the second background according to the first background may include: generating the second background that does not include the content of the first background according to the first background, or generating the second background that includes the content of the first background.

It should be noted that, according to the first background, AIGC may be used to learn the relevant features of the first background, such as style, composition, color, technique, etc., to generate at least one second background that does not include any content of the first background and is related to the first background in terms of content. When generating the second background in this way, a graph generation model may be used to generate at least one second background corresponding to the first background according to the feature information of the first background and the prompt words (prompt) input by the user.

Or, in another embodiment, as shown in FIG. 8, the first background may be expanded by a diffusion model to generate the second background including the first background.

Figure 11:
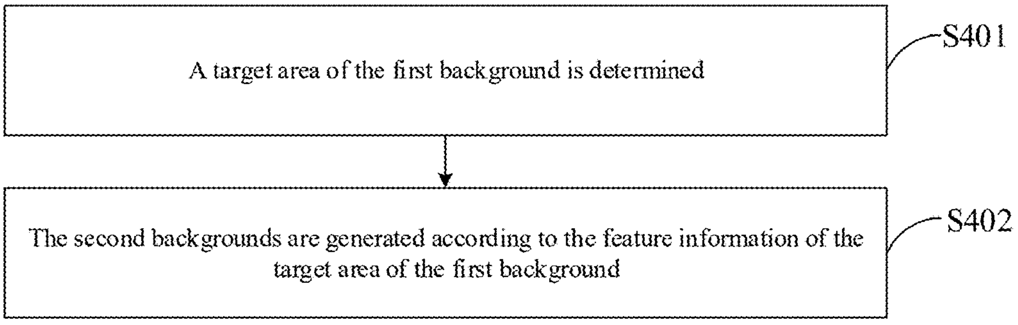
FIG. 11 is another flowchart of a method for generating display background of an electronic device consistent with the present disclosure.

In some embodiments, as shown in FIG. 11, which is a schematic diagram of a method for generating display background of an electronic device, generation of the second background according to the first background may include S401 and S402.

At S401, a target area of the first background is determined.

The target area may include at least part of the content of the first background.

It should be noted that the target area of the first background may include the entire first background, or may be a portion of the first background determined by the user through operation selection.

S402, the second background is generated according to the feature information of the target area of the first background.

The second background may be correlated with the target area of the first background.

As mentioned above, the feature information of the target area may include many relevant features such as style, elements, composition, color, technique, tone, etc. for describing the target area. In some embodiments, the feature information of the target area may also include at least one prompt word, which may include a text prompt word determined according to the text input by the user, or may include text prompt words obtained by inputting the target area into tools for generating text by images, such as a CLIP-interrogator, or may include picture prompt words inferred from the picture obtained by inputting the target area into a pre-trained model A.

Exemplarily, when the generated second background does not include the first background, at least one second background may be generated according to the feature information of the target area of the first background through a pre-trained image generation model. For example, the target area of the first background may be input into a pre-trained model A, and the picture prompt word may be output by the model A. The picture prompt word, the text prompt word input by the user, and the feature information of the target area may be input into the above-mentioned image generation model together, and at least one second background may be output according to a preset number. In some embodiments, when the user does not input a text prompt word, a picture prompt word may also be used as a text prompt word, or a text prompt word may be generated through some image-to-text tools, and then the picture prompt word, the text prompt word input by the user, and the feature information of the target area may be input into the above-mentioned image generation model together to output at least one second background.

When training the above-mentioned image generation model, a data set including multiple groups of associated background where each group includes two background, may be used as a training set. By inputting one of the background in each group into the image generation model, the training constraint of the graph generation model may be that the corresponding output is close to the other background in the group, such that the image generation model understands the meaning of the associated background during the training process.

Alternatively, when the generated second background includes the first background, the target area of the first background may be diffused into noise points through a diffusion model. Or the noise points may be diffused into an image, and then the second background may be generated by inputting the target area into the semantic segmentation model of "the upper and lower screens are divided by the hinge of the dual-screen device."

In some embodiments, the generation of the second background according to the first background may include: obtaining the attribute information of the first display screen and/or the attribute information of the second display screen, and generating the second background according to the attribute information of the first display screen and/or the attribute information of the second display screen, and the first background.

In one embodiment of the present disclosure, the attribute information of the first display screen may include the size, resolution, etc. of the first display screen, and the attribute information of the second display screen may include the size, resolution, etc. of the second display screen. The attribute information of the first display screen and the attribute information of the second display screen may be pre-stored in the electronic device and obtained by reading when the electronic device needs it.

Exemplarily, in one embodiment where the second background generated by the electronic device does not include the first background, when the first background is displayed on the first display screen of the electronic device, the second background may be generated according to the attribute information of the second display screen, such as resolution, size, etc., and the target area of the first background, such that the second background matches the attribute information of the second display screen for display. For example, when the resolution of the second display screen is 2880×1800, the size of the second background generated by the image generation model based on the learning of the information related to the first background may be 2880×1800. Alternatively, when the first background is displayed on the second display screen of the electronic device, second background with a resolution of 2880×1800 may be generated according to the attribute information of the first display screen, such as the resolution of 2880×1800, and the target area of the first background, such that the second background matches the attribute information of the first display screen for display.

Alternatively, in one embodiment where the second background generated by the electronic device includes the first background, the second background may be obtained by expanding the image based on the target area of the first background through a diffusion model or other tools, such as Stable diffusion, according to the attribute information of the first background and the second background. For example, when the resolution of the first display screen is 2880×1800 and the resolution of the second display screen is 2880×1800, the size of one generated second background may need to be larger than or equal to the sum of the resolution of the first display screen and the resolution of the second display screen, that is, the size of the second background may be larger than or equal to 2880×3600.

In the method for generating the display background of the electronic device, present by the present disclosure, the second background may be generated based on the target area of the first background and the attribute information of each screen. The generated second background may be flexible and diverse, and the user's participation and interest may also be improved during the generation process to meet the diverse needs of users.

In another embodiment of the present disclosure, the correlation between the second background and the first background may include that: the first background and the second background present content with symmetrical layout, or the second background present content with symmetrical layout.

In one embodiment of the present disclosure, the correlation between the second background and the first background may be a theme association, an image feature correlation, or the correlation may be the possible extensible development between the second background and the first background, deduced as a story-telling background. Under the premise of the aforementioned content correlation, according to the content of the first background and the second background, when the second background does not include the first background, the first background and the second background may be symmetrical in layout, or, when the second background includes the first background, the second background may be symmetrically distributed in layout.

For example, as shown in FIG. 6, when the first background is a background of the sky displayed on the upper screen 2011 of the dual-screen device 201, the content of the generated second background may be the ocean reflecting the sky, which not only contrasts with the first background in content, belongs to the same landscape theme, but also is symmetrically distributed in layout with the first background with the coastline as the axis.

Figure 12:
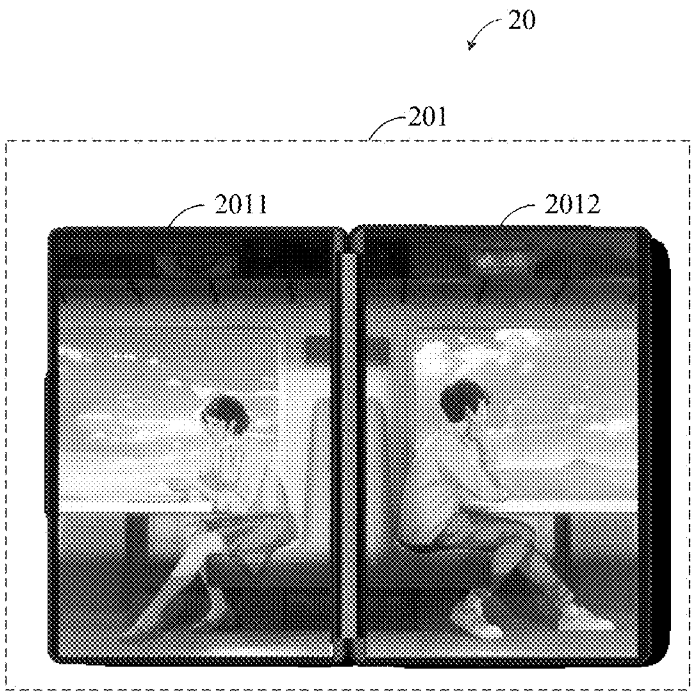
FIG. 12 is another schematic diagram showing display background of an electronic device consistent with the present disclosure.

Or, exemplarily, in one embodiment, as shown in FIG. 12, when the dual-screen device 201 is in the BOOK mode, when the first background is a girl displayed on the upper screen 2011 of the dual-screen device 201, the generated second background may be a boy displayed on the lower screen 2012 of the dual-screen device 201. The girl in the first background and the boy in the second background may not only trigger reverie and have storytelling, but may also present a symmetrical distribution in layout with the backrest of the train as the axis.

Or, in some embodiments, the first background and the second background may also be partially symmetrical. For example, as shown in FIG. 8, when the first background is a building on the shore of the lake, the generated second background may be an extension of the first background. In the extended second background, the lake shore may extend to the mountains, the lake may extend to the reflection of the building on the lakeside in the first background, and the boat may also be extended, such that the second background is not only partially symmetrical in layout, but also an extension of the first background, enriching the storytelling of the background under the same theme.

The present embodiment provides a method for generating display background of an electronic device, and the generated second background may be symmetrical with the first background, or the second background may be symmetrical in layout, which improves the beauty of the generated second background and increases the user's interest in use.

In another embodiment, before the determination of the first background, the method may also include: determining that the relative position relationship between the first display screen and the second display screen is changed from the first relative position relationship to the second relative position relationship; and, adjusting the properties of the first background and the second background such that the first background and the second background match the second relative position relationship, or adjusting the properties of the second background such that the second background match the second relative position relationship.

Figure 13:
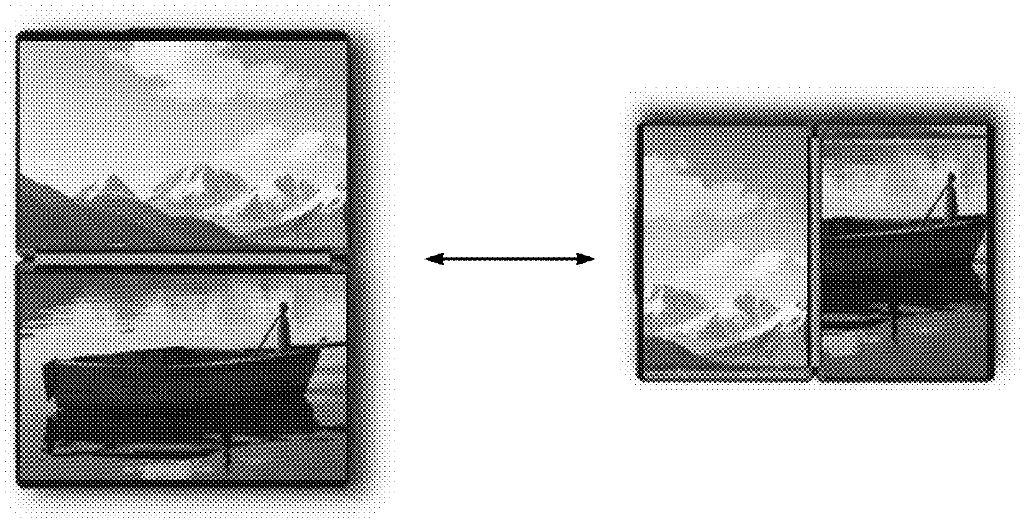
FIG. 13 is a schematic diagram showing display background where a positional relationship changes consistent with the present disclosure.
Figure 14:
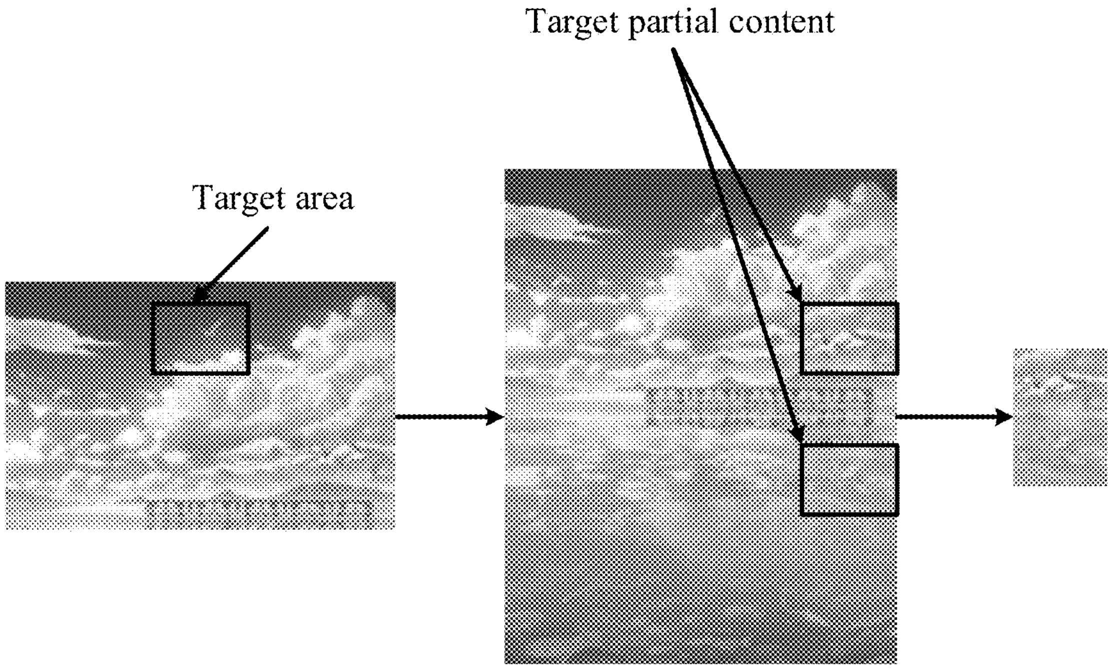
FIG. 14 is another schematic diagram showing display background of an electronic device consistent with the present disclosure.

The relative position relationship between the first display screen and the second display screen may include multiple types. Exemplarily, as shown in FIG. 13, when the electronic device includes a dual-screen device, the dual-screen device on the left side of FIG. 13 is in the PC mode, and the dual-screen device on the right side of FIG. 13 is in the BOOK mode which may correspond to the second relative position relationship. The relative position relationship may include at least one of relative direction, relative distance, or relative angle between the display screens.

In some embodiments, when the PC mode corresponds to the first relative position relationship and the BOOK mode corresponds to the second relative position relationship, taking the second background not including the first background as an example, when the dual-screen device changes from the first relative position relationship to the second relative position relationship, the first background may be partially redrawn and expanded according to the properties of the corresponding screen under the second position relationship, that is, the resolution, and the second background may be redrawn and expanded, or the second background may be re-generated based on the first background, such that the sizes of the first background and the second background match the converted second position relationship.

Alternatively, when the PC mode corresponds to the first relative position relationship and the BOOK mode corresponds to the second relative position relationship, taking the second background including the first background as an example, when the dual-screen device changes from the first relative position relationship to the second relative position relationship, the original second background may be redrawn and expanded according to the properties of the corresponding screen under the second position relationship, that is, the resolution, and then the second background may be re-divided or cropped according to the corresponding screen under the second position relationship to obtain multiple background and display them on the corresponding screens.

It should be noted that in some other embodiments, the BOOK mode may also correspond to the first relative position relationship, and the PC mode may also correspond to the second relative position relationship. When the electronic device also includes other modes, the corresponding relationship with the relative position relationship may be adaptively set.

In one embodiment of the present disclosure, the electronic device may determine the device form, that is, the relative position relationship, according to parameter information of an internal sensor. The parameter information of the sensor may include gravity parameter information, angle parameter information, etc. When the first relative position relationship is changed to the second relative position relationship, the parameter information of the sensor may change accordingly, and the range of the parameter information of the sensor after changing may be used to determine the second relative position relationship.

It should also be noted that, as shown in FIG. 13, when the first relative position relationship is changed to the second relative position relationship, the content of the first background and the second background may not change, and only the size may change by redrawing. Or, in some embodiments, it may be also possible to regenerate the second background different from the second background content under the first relative position relationship according to the user setting.

Further, when the user changes the electronic device from the first relative position relationship to the second relative position relationship for the first time, the second background under the first relative position relationship and the second background under the newly obtained second relative position relationship may be stored in the preset database. In this way, when the user changes the electronic device from the second relative position relationship to the first relative position relationship, the electronic device may directly retrieve the corresponding second background for display according to the relative position relationship.

The present embodiment provides a method for generating display background of an electronic device. When the relative position relationship changes, the properties of the first background and the second background, or the properties of the second background, may be adjusted to match the transformed relative position relationship. This may solve the problem of black edges appearing on two sides of the wallpapers when the relative position relationship changes, and improve the adaptability of the background.

In one embodiment, in the method for generating the display background of the electronic device, the generation of the second background according to the first background may include following processes.

S1, the AIGC model, that is, the aforementioned image generation model, may be used to learn the background layout in the dual-screen form. Because of the special screen shape of the dual-screen device, the dual-screen background may also have some unique features. As shown in FIG. 6, for example, the basic features may include that the upper and lower symmetry where the hinge in between is a symmetrical axis, there is an element layout up and down in the symmetry shaft, and the overall picture forms a story. Similar layouts may be used as training sets for training the AIGC model. The AIGC model may learn the layout of the first background, which is used to generate the second background that conforms to the layout.

S2, the second background may be generated. When in the PC mode, the user may upload one first background to display on the upper screen. The AIGC model may obtain the form of the dual-screen device based on the parameter information of the sensor, understand that the dual-screen device is currently in the PC mode, and extract main elements of the first background. Based on the previous learning of the AIGC model for the background layout, one second background with a similar layout and a resolution of 2880×1800 corresponding to the lower screen of the dual-screen device, forming an interactive dual-screen background that conforms to the shape of the dual-screen device. When the user is converted from the PC mode to the BOOK mode, the resolution of the current required background may change, and the AIGC model may identify that the current mode changes to the Book mode based on the changes in the parameter information of the sensor. The AIGC model may first re-draw the second background and the AIGC model may be used to expand the image to form a new first background with a resolution of 2880×1800 and corresponding to the left screen of the dual-screen device. According to the new first background, the learned layout features in the BOOK mode may be used to generate one new second background.

It should be noted that in one mode, the electronic device may generate one second background. To adapt to different modes, each mode may correspond to one second background. And the background of multiple display screens in different modes may be related. When the second background generated does not include the first background, the first background may be entered into the AIGC model, such as the semantic segmentation model of "upper and lower screens is divided by hinge," to directly generate a whole wallpaper that is not cut off in the middle area with a resolution of 2880×3600 corresponding to the sum of the size of multiple screens of electronic devices. When the second background generated includes the first background, the prompt words may be obtained based on parsing the first background, and the second background, with the same style and similar elements as the first background, may be obtained through the AIGC model; such as the diffusion model. The diffusion model may include spreading the image into noise, or spreading the noise into an image. Stable Diffusion may also be a diffusion model and may have a role to control all the processes of image generation.

In one embodiment, the process of training the AIGC model may include: providing background resources related to the upper and lower screens that meet the requirements, where two pieces may be on set and multiple sets are required; and defining a standard that meets the requirements, where the model is required to output content closest to the second background y1 when the first background x1 is input, that is, letting the model understand the meaning of similar pictures. When the AIGC model is used after training, the current wallpaper may be first sent to the model A to obtain the corresponding output content. The output content may be used as the image prompt word of the image generation model, and may be sent to the image generation model together with the text prompt word to obtain the corresponding second background. When there is no text prompt word, the first background may be used to generate text using some image-generated-text tools, such as CLIP-interrogator, to reverse the picture into text as the text prompt word to obtain the second background.

In some embodiments, when the user selects a local area of one screen, the second background may be generated using an optimized large model, and the mode attributes of the electronic device may also be passed to the large model to match and generate the second background with a story.

The present embodiment provides a method for generating display background of an electronic device. The wallpapers in different modes may be generated using the AIGC model. Therefore, the user may avoid the trouble of searching for a set of wallpaper resources, and also the wallpaper stories that present complete stories in different modes may be obtained.

In another embodiment of the present disclosure, determination of the target partial contents corresponding to the first display screen and the second display screen respectively based on the relative position relationship between the first display screen and the second display screen may include:

adjusting the attributes of the target partial content corresponding to the second display screen based on the attribute information of the second display screen to adapt to the attribute information of the second display screen for display.

The second background, including the first background's content, may be generated according to the first background. The resolutions of the first display screen and the second display screen may be inconsistent. For example, the resolution of the first display screen may be 1280×800, and the resolution of the second display screen may be 1024×768. The second background may be generated according to the resolution of the first display screen, for example, 2560×800 with symmetrical content. After determining the first target partial content of the first display screen, the target content corresponding to the second display screen may be adjusted to the display content of the second display screen with the resolution of 1024×768.

Figure 16:
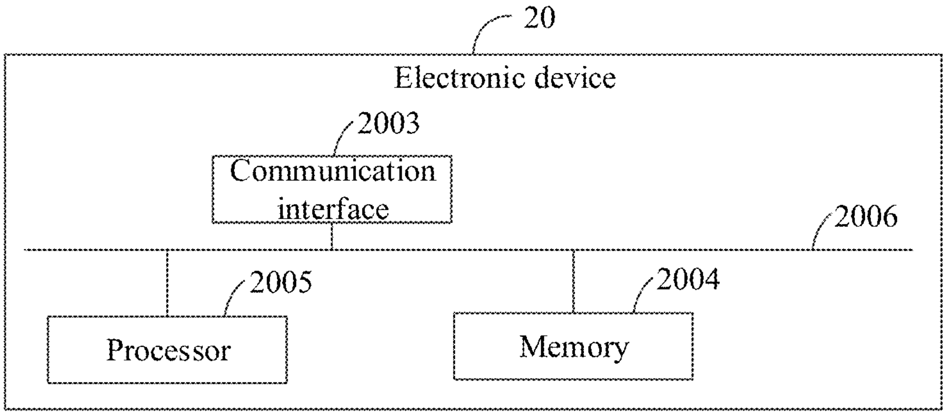
FIG. 16 is a hardware structural diagram of an electronic device consistent with the present disclosure.

As shown in FIG. 16, the user may select on the first background, and after determining the target area, the AIGC model may expand the image based on the target area of the first background to generate the second background. Alternatively, when the user does not select, the AIGC model may directly expand the image based on the first background to generate the second background. When the generated second background includes the target area of the first background, the user may crop or frame the generated second background multiple times, determine at least one unconnected part of the second background, and splice it as the target partial content. Therefore, the size of the target partial content may not match the resolution of the second display screen. Correspondingly, the attributes of the target partial content, such as size or resolution, may be adaptively adjusted to match the attribute information of the second display screen, to be displayed on the second display screen.

The present disclosure provides a method for generating display background of an electronic device. Adaptive adjustments may be performed when the attributes of the target partial content do not match those of the display screen, thereby improving the adaptability of the background.

Figure 15:
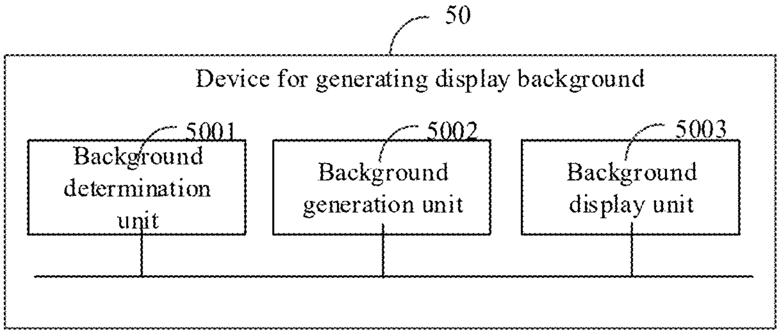
FIG. 15 is a structural diagram of a device for generating display background of an electronic device consistent with the present disclosure.

The present disclosure also provides a device for generating display background. In one embodiment, as shown in FIG. 15 which is a structural schematic diagram of a device 50 for generating display background, the device 50 for generating the display background includes:

a background determination unit 5001, configured to determine first background in response to a trigger operation of a user on a display screen of an electronic device;

a background generation unit 5002, configured to generate second background based on the first background, where the second background is correlated with the first background; and a background display unit 5003, configured to display the second background and the first background on multiple display screens, respectively, or to display part of the content of the second background on multiple display screens, respectively, where the part of the content corresponding to the multiple display screens may constitute the second background.

The background display unit 5003 may also be configured that the multiple display screens are all set on the electronic device, or at least one of the multiple display screens belongs to an external display screen of the electronic device.

The background display unit 5003 may also be configured to: determine a first display screen and a second display screen among the multiple display screens; according to the relative position relationship between the first display screen and the second display screen, the content of the first background and the content of the second background, determine target display screens where the first background and the second background are to be displayed respectively, where one target display screen is any one of the first display screen or the second display screen.

The background display unit 5003 may also be configured to: determine the target partial contents corresponding to the first display screen and the second display screen respectively based on the relative position relationship between the first display screen and the second display screen.

The background generation unit 5002 may be further configured to generate the second background that does not include the content of the first background according to the first background, or to generate the second background that includes the content of the first background.

The background generation unit 5002 may be further configured to: obtain the attribute information of the first display screen and/or the attribute information of the second display screen; and generate the second background according to the attribute information of the first display screen and/or the attribute information of the second display screen and the first background.

The background generation unit 5002 may be further configured to: determine the target area of the first background where the target area at least includes part of the content of the first background; and generate the second background according to the feature information of the target area of the first background, where the second background are correlated with the target area of the first background.

The background generation unit 5002 may be further configured to present the content with symmetrical layout in the first background and the second background, or to present the content with symmetrical layout in the second background.

The background determination unit 5001 may be further configured to: determine that the relative position relationship between the first display screen and the second display screen is changed from the first relative position relationship to the second relative position relationship; and adjust the attributes of the first background and the second background such that the first background and the second background match the second relative position relationship, or adjust the attributes of the second background such that the second background matches the second relative position relationship.

The background display unit 5003 may be further configured to: adjust the attributes of the target partial content corresponding to the second display screen based on the attribute information of the second display screen, such that the content is displayed in accordance with the attribute information of the second display screen.

In the present disclosure, a "unit" may be part of a circuit, part of a processor, part of a program or software, etc. Of course, it may also be a module or may be non-modular. Moreover, components in the present disclosure may be integrated into a processing unit, or each unit may exist physically separately, or two or more units may be integrated into one unit. The above-mentioned integrated unit may be implemented in the form of hardware or in the form of a software function module.

When one integrated unit is implemented in the form of a software function module and is not sold or used as an independent product, it may be stored in a computer-readable storage medium. Based on this understanding, all or part of the technical solution of the present disclosure that essentially contributes to technologies may be embodied in the form of a software product, which is stored in a storage medium and includes several instructions for a computer device (which may be a personal computer, a server, or a network device, etc.) or a processor to perform all or part of the steps of the methods provided by various embodiments of the present disclosure. The aforementioned storage medium may include: a flash disk, a mobile hard disk, a read-only memory (ROM), a random access memory (RAM), a magnetic disk, an optical disk, or other media that can store program codes.

Therefore, the present disclosure also provides a computer-readable storage medium, which stores a computer program. When the computer program is executed by at least one processor, the method for generating display background of an electronic device provided by various embodiments of the present disclosure may be implemented.

In some embodiments shown in FIG. 16, which is a schematic diagram of the hardware structure of an electronic device, the electronic device 20 may include: a communication interface 2003, a memory 2004, and a processor 2005. Each component may be coupled together through a bus system 2006. It is understandable that the bus system 2006 may be used to realize the connection and communication between these components. In addition to the data bus, the bus system 2006 may also include a power bus, a control bus, and a status signal bus. For the sake of clarity, various buses are marked as the bus system 2006 in FIG. 16.

The communication interface 2003 may be configured to receive and send signals during the process of sending and receiving information with the power supply device.

The memory 2004 may be configured to store a computer program able to be executed on the processor 2005.

The processor 2005 may be configured to, when running the computer program:

in response to a trigger operation of a user on a display screen of the electronic device, determine first background;

based on the first background, generate second background, where the second background is correlated with the first background; and display the second background and the first background on the multiple display screens respectively, or display part of the content of the second background on multiple display screens respectively, where the part of the content corresponding to the multiple display screens can constitute the second background.

In various embodiments, the memory 2004 may be a volatile memory or a non-volatile memory, or may include both volatile and non-volatile memories. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous link dynamic random access memory (SLDRAM) and direct RAM bus random access memory (DRRAM). The memory 2004 of the system and method described herein is intended to include but is not limited to these and any other suitable types of memory.

The processor 2005 may be an integrated circuit chip with signal processing capabilities. In the implementation process, the method provided by various embodiments of the present disclosure may be completed by hardware-integrated logic circuits in the processor 2005 or instructions in software form. The processor 2005 may be a general-purpose processor, a digital signal processor (DSP), an application-specific integrated circuit (ASIC), a field programmable gate array (FPGA) or other programmable logic devices, discrete gates or transistor logic devices, discrete hardware components. The methods, steps and logic block diagrams disclosed in the embodiments of the present disclosure may be implemented or executed. The general-purpose processor may be a microprocessor or the processor may also be any conventional processor, etc. The method provided by various embodiments of the present disclosure may be directly embodied as being executed by a hardware decoding processor, or may be executed by a combination of hardware and software modules in the decoding processor. The software module may be located in a mature storage medium in the art such as a random access memory, a flash memory, a read-only memory, a programmable read-only memory or an electrically erasable programmable memory, a register, etc. The storage medium may be located in the memory 2004, and the processor 2005 may read the information in the memory 2004 and complete the method provided by various embodiments of the present disclosure in combination with its hardware.

It is understood that the embodiments described herein may be implemented in hardware, software, firmware, middleware, microcode or a combination thereof. For hardware implementation, the processing unit may be implemented in one or more application specific integrated circuits (ASIC), digital signal processors (DSP), digital signal processing devices (DSPD), programmable logic devices (PLD), field programmable gate arrays (FPGA), general processors, controllers, microcontrollers, microprocessors, other electronic units for performing the functions described in the present disclosure, or a combination thereof.

For software implementation, the technology described herein may be implemented by modules (e.g., procedures, functions, etc.) that perform the functions described herein. The software code may be stored in a memory and executed by a processor. The memory may be implemented in a processor or outside a processor.

Optionally, in another embodiment, the processor 2005 may be further configured to execute the steps of the method described in any one of the aforementioned embodiments when running the computer program.

In another embodiment, the electronic device 20 may further include at least one display screen and a device for generating the aforementioned display background, and at least one display screen may be provided by the aforementioned dual-screen device and an external display screen, or by the aforementioned dual-screen device.

The above are only some preferred embodiments of the present disclosure and are not intended to limit the scope of protection of the present disclosure. Any modifications, equivalent replacements and improvements made within the spirit and principles of the present disclosure shall be included in the scope of protection of the present disclosure.

The present disclosure also provides a computer program product including instructions, which, when being executed on a computer, enables the computer to execute the any method for generating display background of an electronic device provided in the above method embodiments.

The description of the above storage medium and device embodiments is similar to the description of the above method embodiments, and has similar beneficial effects as the method embodiments. For the technical details not disclosed in the storage medium and device embodiments of the present application, references may be made to the description of the method embodiments of the present disclosure for understanding.

It should be understood that the "one embodiment" or "the embodiment" or "some embodiments" mentioned in the present disclosure means that the specific features, structures or characteristics related to the embodiments are included in at least one embodiment of the present disclosure. Therefore, "in one embodiment" or "in the embodiment" or "in some embodiments" appearing throughout the specification may not necessarily refer to the same embodiment. In addition, these specific features, structures or characteristics may be combined in one or more embodiments in any suitable manner. It should be understood that in various embodiments of the present disclosure, the size of the sequence number of the above-mentioned processes does not mean the order of execution, and the execution order of each process may be determined by its function and internal logic, and should not constitute any limitation on the implementation process of the embodiments of the present disclosure. The above-mentioned sequence number of the embodiments of the present disclosure is only for description and does not represent the advantages or disadvantages of the embodiments. The above description of each embodiment tends to emphasize the differences between the various embodiments, and the same or similar parts may refer to each other. For the sake of brevity, the present disclosure does not repeat them.

It should also be noted that in the present disclosure, the terms "include," "comprise" or any other variant thereof are intended to cover non-exclusive inclusion, such that a process, method, article or device including a series of elements includes not only those elements, but also other elements not explicitly listed, or also includes elements inherent to such process, method, article or device. In the absence of further restrictions, an element associated with the sentence "includes one . . . " does not exclude the presence of other identical elements in the process, method, article or device including the element.

The methods provided by various embodiments of the present disclosure may be combined obtain new method embodiments so long as there is no conflict.

The features provided by various product embodiments of the present disclosure may be combined to obtain new product embodiments so long as there is no conflict.

The features disclosed in several method or device embodiments provided by the present disclosure may be combined to obtain new method embodiments or device embodiments so long as there is no conflict.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A display background generation method for an electronic device having a first display screen and a second display screen coupled by a hinge, comprising:

in response to a trigger operation on the first display screen, determining a first background;

acquiring attribute information of the second display screen, the attribute information including a resolution of the second display screen;

determining, according to parameter information from a sensor of the electronic device, a device mode corresponding to an orientation of the first display screen and the second display screen;

generating, through an artificial intelligence generative content model and based on the first background, the attribute information of the second display screen, and the device mode, a second background that is correlated with the first background, the second background correlating with the resolution of the second display screen and a layout corresponding to the device mode, wherein the artificial intelligence generative content model generates the second background at least according to feature information of the first background, the attribute information of the second display screen, and the device mode; and displaying at least one of the second background or the first background on the first display screen and the second display screen, including:

displaying the first background on the first display screen and the second background on the second display screen; or displaying partial contents of the second background on the first display screen and the second display screen, respectively, the partial contents corresponding to the first display screen and the second display screen constituting the second background.

2. The method according to claim 1, wherein the electronic device further comprises an external display screen.

3. The method according to claim 1, wherein displaying the partial contents of the second background on the first display screen and the second display screen, respectively, includes:

determining, based on a relative position relationship between the first display screen and the second display screen, target partial contents corresponding to the first display screen and the second display screen, respectively.

4. The method according to claim 3, wherein determining the target partial contents includes:

adjusting, based on the attribute information of the second display screen, an attribute of the target partial content corresponding to the second display screen, such that the target partial content corresponding to the second display screen is to be displayed in accordance with the attribute information of the second display screen.

5. The method according to claim 1, wherein generating the second background according to the first background, the attribute information of the second display screen, and the device mode includes:

generating, according to the first background, the second background that does not include a content of the first background.

6. The method according to claim 1, wherein generating the second background according to the first background, the attribute information of the second display screen, and the device mode includes:

generating, according to the first background, the second background that includes a content of the first background.

7. The method according to claim 1, wherein generating the second background according to the first background, the attribute information of the second display screen, and the device mode includes:

determining a target area of the first background, the target area including at least part of a content of the first background; and generating the second background according to feature information of the target area, the second background being correlated with the target area.

8. The method according to claim 1, wherein the second background is generated according further to attribute information of the first display screen.

9. The method according to claim 1, wherein generating the second background that is correlated with the first background includes:

generating the second background that is symmetrical to the first background or that presents a content that is symmetrical to a content of the first background.

10. The method according to claim 1, further comprising:

determining a change of the device mode according to the parameter information from the sensor, the change of the device mode corresponding to a relative position relationship between the first display screen and the second display screen changing from a first relative position relationship to a second relative position relationship; and adjusting attributes of the first background and the second background such that the first background and the second background match the second relative position relationship, or adjusting the attribute of the second background such that the second background matches the second relative position relationship.

11. An electronic device comprising:

a first display screen and a second display screen coupled by a hinge;

a sensor;

a memory storing a computer program; and a processor configured to execute the computer program to:

in response to a trigger operation on the first display screen, determine a first background;

acquire attribute information of the second display screen, the attribute information including a resolution of the second display screen;

determine, according to parameter information from the sensor, a device mode corresponding to an orientation of the first display screen and the second display screen;

generate, through an artificial intelligence generative content model and based on the first background, the attribute information of the second display screen, and the device mode, a second background that is correlated with the first background, the second background correlating with the resolution of the second display screen and a layout corresponding to the device mode, wherein the artificial intelligence generative content model generates the second background at least according to feature information of the first background, the attribute information of the second display screen, and the device mode; and display at least one of the second background or the first background on the first display screen and the second display screen, including:

displaying the first background on the first display screen and the second background on the second display screen; or displaying partial contents of the second background on the first display screen and the second display screen, respectively, the partial contents corresponding to the first display screen and the second display screen constituting the second background.

12. The electronic device according to claim 11, wherein the electronic device further comprises an external display screen.

13. The electronic device according to claim 11, wherein the processor is further configured to execute the computer program to, when displaying the partial contents of the second background on the first display screen and the second display screen, respectively:

determine, based on a relative position relationship between the first display screen and the second display screen, target partial contents corresponding to the first display screen and the second display screen, respectively.

14. The electronic device according to claim 13, wherein the processor is further configured to execute the computer program to, when determining the target partial contents:

adjust, based on the attribute information of the second display screen, an attribute of the target partial content corresponding to the second display screen, such that the target partial content corresponding to the second display screen is to be displayed in accordance with the attribute information of the second display screen.

15. The electronic device according to claim 11, wherein the processor is further configured to execute the computer program to, when generating the second background according to the first background, the attribute information of the second display screen, and the device mode:

generate, according to the first background, the second background that does not include a content of the first background.

16. The electronic device according to claim 11, wherein the processor is further configured to execute the computer program to, when generating the second background according to the first background, the attribute information of the second display screen, and the device mode:

generate, according to the first background, the second background that includes a content of the first background.

17. The electronic device according to claim 11, wherein the processor is further configured to execute the computer program to, when generating the second background according to the first background, the attribute information of the second display screen, and the device mode:

determine a target area of the first background, the target area including at least part of a content of the first background; and generate the second background according to feature information of the target area, the second background being correlated with the target area.

18. The electronic device according to claim 11, wherein the processor is further configured to execute the computer program to, when generating the second background according to the first background, the attribute information of the second display screen, and the device mode, generate the second background according further to attribute information of the first display screen.

* * * * *